Patented Nov. 29, 1949

2,489,672

UNITED STATES PATENT OFFICE 2,489,672

DIALIPHATICAMINOALKYLCARDANOL

Anthony J. Revukas, Cranford, N. J., assignor to Tide Water Associated Oil Company, Bayonne, N. J., a corporation of Delaware No Drawing. Application November 19, 1947, Serial No. 787,037

14 Claims. (Cl. 260—570.9)

1

This application is a continuation-in-part of my application, Serial No. 714,663, filed December 6, 1946, now abandoned.

In board aspect, the present invention relates to a novel group of chemical compounds that consist of dialiphatic aminoalkyl cardanols characterized by having a sum of more than six carbon atoms in the dialiphatic grouping and, preferably, a total of about 10 to about 40 carbon atoms. Illustrative of the type of compounds embodied by the present invention are diamylaminomethylcardanol, di-2-ethylhexylaminomethylcardanol, dilaurylaminomethylcardanol, and the like.

In my practice of the present invention, the dialiphatic aminoalkylcardanols are prepared by condensation reaction between cardanol, a secondary aliphatic amine containing more than six carbon atoms, and an aldehyde, as for example an aliphatic aldehyde, such as formaldehyde, acetaldehyde, and homologs thereof, the transformation consisting in the replacement of a reactive hydrogen atom of cardanol by a dialiphatic aminoalkyl grouping. Thus, when formaldehyde is employed, a dialiphatic aminomethylcardanol is formed; when use in made of a higher aldehyde, such as acetaldehyde, propionaldehyde, and the like, the resulting products contain an alkyl substituent for a hydrogen atom of the methylene group connecting the nitrogen atom and the cardanol nucleous. Illustrative of such a method is the procedure as set forth hereinafter which, though relating to preparation of diamylaminomethylcardanol, may suitably be employed for preparing the novel group of compounds embodied herein.

Preparation procedure

Cardanol, obtained as a heart cut (boiling point of about 180 to 230° C.) by distillation of a commercial grade of cardanol at 2 mm. pressure, and diamylamine are charged into a one liter, 3-neck round-bottom flask equipped with a thermometer, a vacuum type stirrer, a dropping funnel, and a reflux condenser. The cardanol and amine are charged in a ratio of one mole of cardanol to at least one mole, e. g., about 1.2 moles, of the amine.

The cardanol-diamylamine solution is stirred vigorously and chilled to below about 20° C., e. g., about 10° C. A suitable aldehyde, as for example formaldehyde, as in the form of a 32–37% aqueous solution, is added slowly, e. g., dropwise, to the flask while the charge is maintained at a temperature not in excess of about 20° C. until at least one mole equivalent of formaldehyde to cardanol has been added, and preferably, until about 1.5 moles of formaldehyde have been added. The reaction, which occurs upon addition of the adehyde, is exothermic and hence, the temperature of the charge tends to rise. Accordingly, the rate of introduction of the formaldehyde is controlled so as to prevent the temperature of the charge from increasing to more than about 20° C., as a temperature rise to above about 20° C. before formaldehyde addition is completed has been found to be undesirable from the view-point of inducing undesirable side reactions to take place. When all of the formaldehyde has been added, the charge is stirred at about 20° C. for about one hour. The formaldehyde-containing mixture may be allowed to stand and react at ordinary room temperatures, or, preferably, the mixture is heated at or below the boiling point of the mixture, e. g., under reflux at about 92° C. for about four hours, to expedite the desired condensation reaction whereby the cardanol is converted to the diamylaminomethylcardanol. Any unreacted diamylamine and formaldehyde, and water are removed by suitable means, preferably by distillation at a pressure of about 10 mm. The distillation is carried out by using a temperature high enough to distill off the undesired components but below the temperature at which polymerization and/or decomposition of the dialiphaticaminoalkylcardanol tends to occur. In preparation of diamylaminomethylcardanol, the distillation to remove undesirable byproducts is conducted at 10 mm. pressure and the temperature of the charge raised gradually to about 145° C. to provide thorough stripping. As polymerization and decomposition of the desired product (diamylaminomethylcardanol) tends to set in at about 150° C., the temperature in the reaction vessel is preferably not allowed to exceed about 145° C. The residue is then cooled to about 60° C. and filtered employing a filter aid, e. g., Celite. Diamylaminomethylcardanol, obtained as the desired reaction product, is a yellow-to-brown oily liquid of relatively high purity. The yield thereof, prepared as aforesaid, corresponds to about 98 to 100% of theory. Diamylaminomethylcardanol was found to have the following analysis and properties.

Analysis

| Nitrogen: | Per cent |
|---|---|
| Theory | 2.97 |
| Found | 2.61; 2.64; 2.82; 2.78; 2.69 |
| Hydroxyl: | |
| Theory | 3.62 |
| Found | 3.74; 3.39; 3.58; 3.78 |

Properties

| | |
|---|---|
| Density (20° C.) | 0.9124 |
| Burn (Cleveland Open Cup °F.) | 410 |
| Flash (Cleveland Open Cup °F.) | 380 |
| Viscosity at 100° F. (centistokes) | 50.0 |
| Color (A. S. T. M.) | 4¼ |
| Carbon residue—percent | 2.30 |
| Refractive index $N_D^{20°}$ | 1.5009 |
| Molar refraction: | |
| Theory | 150.53 |
| Found | 152.31 |

In preparing dialiphaticaminoalkylcardanols in accordance with the present invention, cardanol is condensed with at least one molecular equivalent each of the aldehyde and the dialiphatic amine. However, in order to provide for substantially complete utilization of the cardanol, it is preferable to employ a reaction mixture containing an amount of the amine and aldehyde in excess of molecular equivalents with cardanol. For example, in a preferred embodiment of the present invention, I employ a reaction charge comprising cardanol, the dialiphatic amine, and the aldehyde in proportions of one mole of cardanol to about 1.2 moles of the amine and about 1.5 moles of aldehyde. Use of the amine and aldehyde in such preferred concentrations, in providing for substantially complete conversion of cardanol to dialiphatic aminoalkylcardanol, does not deleteriously affect the desired product of reaction, as, during the preparation, unreacted amine and aldehyde, and water formed by the reaction, or otherwise present, are removed by the distillation. On the other hand, if the reaction is conducted under conditions whereby a substantial amount of cardanol is not converted, use of distillation is unsuitable for separation of the dialiphaticaminoalkylcardanol in substantially pure form.

In further illustration of dialiphaticaminoalkylcardanols, as embodied herein, the following compounds were prepared having the properties set forth. In each case, the procedure employed for preparation was similar to that set forth hereinbefore for preparation of diamylaminomethylcardanol. This is, reactant properties were in the ratio of one mole of cardanol to 1.2 moles of the amine and 1.5 moles of aldehyde, and the temperature of the charge was maintained at below about 20° C. during aldehyde addition. In the preparation of di-2-ethylhexylaminomethylcardanol, separation thereof from the reacted mixture was by distillation at 179° C. at 11 mm. pressure, di-n-butylaminomethylcardanol was recovered by disstillation at 130° C. at 10 mm. pressure, and dilaurylaminomethylcardanol at 125° C. at 10 mm.

| | Density at 20° C. | Refractive Index | Molar Refraction | |
|---|---|---|---|---|
| | | | Theory | Found |
| Di-2-ethylhexylaminomethylcardanol | 0.9075 | 1.4949 | 178.71 | 178.62 |
| Di-n-butylaminomethylcardanol | 0.9231 | 1.5030 | 141.89 | 142.09 |
| Dilaurylaminomethylcardanol | 0.8884 | 1.4893 | 215.53 | 217.17 |

The dialiphatic aminoalkylcardanols embodied herein are, as far as I am aware, novel compounds that find a number of uses hitherto not generally characteristic of or anticipated for such a class of compounds. For example, these novel compounds have been found to possess highly effective demulsifying properties for oil-water emulsions. Additionally, and of considerable practical utility is the discovery that these novel compounds have an unexpected and high degree of effectiveness for reducing the tendency of polymeric esters of the acrylic series to induce emulsification of an oil over and above any tendency, if any, of the oil itself to emulsify. Hence, the novel compounds as embodied herein find utility as demulsifying agents for emulsions of oil with water, particularly mineral oils, and as addition agents for oil compositions containing polymeric esters of the acrylic series to decrease the tendency of the polymers to induce emulsification of the oil. In my aforesaid application, Serial No. 714,663, data has been set forth showing the highly effective demulsification properties resulting from use of diamylaminomethylcardanol as a demulsifier for oils emulsified with either salt or distilled water and tested in accordance with the method set forth therein as procdure A. Briefly, the test method comprises preparation of a mixture of 40 parts by volume of the oil composition with 40 parts of either distilled or salt water, heating the mixture to 130° F., stirring the mixture for five minutes at 1500 revolutions per minute at 130° F. to emulsify the mixture, and maintaining the resulting composition at 130° F. and observing the amount of emulsion, in milliliters, present at five minute intervals over a period of 60 minutes. Employing the same test procedure, the following tabulation clearly shows the highly effective demulsifying characteristics provided by use of dialiphaticaminoalkylcardanols having a sum of more than six carbon atoms in the dialiphatic grouping, i. e., the compounds as embodied herein. The presence of such a relatively high number of carbon atoms in the dialiphatic grouping is of considerable importance, especially when the compounds are employed for demulsifying oil-water emulsions, as is evidenced by the data included in the following tabulation showing the highly ineffective results obtained when using compounds of the same class, homologous with respect to the dialiphatic grouping, but which contain a lower number of carbon atoms in the dialiphatic grouping. As shown, whereas compounds as embodied herein functioned satisfactorily as demulsifiers, use of dimethylaminomethycardanol and diethylaminomethylcardanol not only failed to perform as demulsifiers but, on the contrary, actually enhanced emulsification of oil-water emulsions:

| Test No. | Test Composition (equal parts by volume) | Per Cent by weight of dialiphatic aminomethylcardanol | Results employing test procedure A | |
|---|---|---|---|---|
| | | | 30 min. reading | 60 min. reading |
| BASE EMULSIONS | | | | |
| | | | ml. | ml. |
| 1 | turbine grade lubricating oil and aqueous salt solution. | None | 14 | 12 |
| 2 | turbine grade lubricating oil and distilled water. | None | 9 | 8 |

| Test No. | Test Composition (equal parts by volume) | Per Cent by weight of dialiphatic aminomethylcardanol | Results employing test procedure A | |
|---|---|---|---|---|
| | | | 30 min. reading | 60 min. reading |
| BASE EMULSIONS PLUS DIALIPHATICAMINOMETHYLCARDANOLS CONTAINING MORE THAN SIX CARBON ATOMS IN THE DIALIPHATIC GROUPING | | | | |
| 3 | same as test no. 1 | 0.05 diamylaminomethylcardanol | 3 | 3 |
| 4 | same as test no. 2 | do | 2 | 1 |
| 5 | same as test no. 1 | 0.05 dibutylaminomethylcardanol | 3 | 1 |
| 6 | do | 0.05 di-2-ethylhexylaminomethylcardanol | Complete resolution in 14 minutes. | |
| 7 | same as test no. 2 | do | 2 | 1 |
| BASE EMULSIONS PLUS DIALIPHATICAMINOMETHYLCARDANOLS THAT DO NOT CONTAIN MORE THAN SIX CARBON ATOMS IN THE DIALIPHATIC GROUPING | | | | |
| 8 | same as test no. 1 | 0.05 dimethylaminomethylcardanol | 44 | 31 |
| 9 | same as test no. 2 | do | 46 | 30 |
| 10 | same as test no. 1 | 0.05 diethylaminomethylcardanol | 15 | 13 |
| 11 | same as test no. 2 | do | 18 | 21 |

In further illustration of the importance of having more than six carbon atoms in the dialiphatic grouping of the dialiphaticaminoalkylcardanols as embodied herein, the following tabulation illustrates the ineffectiveness of diisopropyl aminomethylcardanol as a demulsifier as compared to the highly effective demulsification resulting from use of a compound falling within the scope of the present invention, as exemplified by dilaurylaminomethylcardanol.

| Test No. | Test Composition (equal parts by volume) | Per Cent by weight of dialiphatic aminomethylcardanol | Results employing test procedure A | |
|---|---|---|---|---|
| | | | 30 min. reading | 60 min. reading |
| 12 | turbine grade lubricating oil and salt water | None | 4 | 2 |
| 13 | same as test no. 12 | 0.05 Diisopropylaminomethylcardanol | 7 | 4 |
| 14 | do | 0.05 Dilaurylaminomethylcardanol | Complete resolution in 12 minutes | |

Although the present invention has been described in conjunction with certain preferred embodiments thereof, those skilled in the art will readily recognize that variation and modifications can be made. Such variations and modifications are to be considered to be within the purview of the specification and the scope of the appended claims.

I claim:

1. A dialiphaticaminoalkylcardanol containing a sum of more than six carbon atoms in the dialiphatic grouping.

2. A dialiphaticaminoalkylcardanol containing a sum of ten to forty carbon atoms in the dialiphatic grouping.

3. A dialkylaminomethylcardanol containing a sum of from more than six and up to forty carbon atoms in the dialkyl grouping.

4. Di-2-ethylhexylaminomethylcardanol.

5. Diamylaminomethyl cardanol.

6. Dilaurylaminomethylcardanol.

7. Di-n-butylaminomethyl cardanol.

8. A method for preparing dialiphaticaminoalkylcardanols which comprises preparing a solution of cardanol with a secondary aliphatic amine containing more than six carbon atoms in the dialiphatic grouping in a ratio of one mole of cardanol to at least one mole of said amine, adding to said solution an aldehyde in an amount at least equal to a mole equivalent with said cardanol while maintaining said solution at a temperature not exceeding about 20° C. until said aldehyde addition is completed to form a mixture containing said aldehyde, heating said aldehyde-containing mixture to a temperature above 20° C., but below the boiling point of said mixture, to expedite reaction thereof and convert the cardanol therein to dialiphaticaminoalkylcardanol, and separating said dialiphaticaminoalkylcardanol from said mixture.

9. A method for preparation of dialiphaticaminoalkylcardanols which comprises preparing a solution containing cardanol and a secondary aliphatic amine in a ratio of one mole of cardanol to at least one mole of amine, said amine being characterized by containing more than six carbon atoms, adding an aliphatic aldehyde to said solution in an amount at least equal to a mole equivalent with said cardanol to form a mixture containing said aldehyde, said solution being maintained at a temperature not in excess of about 20° C. until said aldehyde addition is completed, heating said aldehyde-containing mixture to a temperature above 20° C., but below the boiling point of said mixture, to convert substantially all of the cardanol to dialiphaticaminoalkylcardanol to provide a mixture containing dialiphaticaminoalkylcardanol, and separating dialiphaticaminoalkylcardanol in substantially pure form from said mixture.

10. A method for preparing dialiphaticaminoalkylcardanols in high yields and in substantially pure form which comprises (a) preparing a solution containing a ratio of one mole of cardanol to at least one mole of a secondary aliphatic amine having a sum of more than six carbon atoms (b) adding to said solution an amount of an aldehyde at least equal to a mole equivalent with said cardanol to provide an aldehyde containing mixture, said solution being maintained at a temperature not exceeding about 20° C. until said aldehyde addition is completed (c) heating said aldehyde-containing mixture to a temperature above 20° C., but below the boiling point of said mixture, to convert substantially all of said cardanol to dialiphaticaminoalkylcardanol to provide a dialiphaticaminoalkylcardanol-containing mixture, (d) and recovering dialiphaticaminoalkylcardanol as a residue from said mixture by subjecting said mixture to distillation at a temperature sufficient to remove unreacted materials and reaction byproducts but below the temperature at which decomposition and polymerization of the dialiphaticaminoalkylcardanol tends to occur.

11. A method for preparing a dialiphaticaminoalkylcardanol which comprises (a) preparing a solution containing a ratio of one mole of cardanol to at least one mole of a secondary aliphatic amine having a sum of more than six carbon atoms, (b) maintaining said solution at a temperature not in excess of about 20° C. while adding thereto an aldehyde in an amount at least equal to one mole equivalent with said cardanol, said aldehyde being added at a rate insufficient to increase the temperature of said solution to more than about 20° C., to provide an aldehyde-containing mixture (c) heating said aldehyde-containing mixture to above 20° C., but below the boiling point of said mixture, to expedite reaction thereof and convert substantially all of said cardanol to dialiphaticaminoalkylcardanol to provide a dialiphaticaminoalkylcardanol-containing mixture, (d) distilling said dialiphaticaminoalkylcardanol-containing mixture at a temperature below that at which the dialiphaticaminoalkylcardanol tends to decompose but at a temperature effective to remove unreacted components and reaction by-products contained in such mixture, and (e) recovering dialiphaticaminoalkylcardanol as the residue from said distillation.

12. A method for preparing diamylaminomethylcardanol in high yields which comprises preparing a solution containing cardanol and diamylamine in a ratio of one mole of cardanol to at least one mole of said amine, adding to said solution an amount of formaldehyde at least equal to a mole equivalent of said cardanol to provide a formaldehyde-containing mixture, said solution being maintained at a temperature not exceeding about 20° C. until said formaldehyde addition is completed, heating the resulting formaldehyde-containing mixture to a temperature above 20° C. but below the boiling point of said mixture to expedite reaction thereof and convert the cardanol therein to diamylaminomethylcardanol to provide a diamylaminomethylcardanol-containing mixture, and separating diamylaminomethylcardanol from said mixture.

13. A method for preparing diamylaminomethylcardanol in high yields and in substantially pure form which comprises preparing a solution containing cardanol and diamylamine in the ratio of one mole of cardanol to at least one mole of said amine, adding to said solution an amount of formaldehyde at least equal to a mole equivalent of said cardanol to provide a formaldehyde-containing mixture, said solution being maintained at a temperature not exceeding about 20° C. until said formaldehyde addition is completed, heating the resulting formaldehyde-containing mixture to a temperature not exceeding the boiling point of said mixture to expedite reaction thereof and convert the cardanol to diamylaminomethylcardanol to provide a mixture containing diamylaminomethylcardanol, subjecting said diamylaminomethylcardanol-containing mixture to distillation at a temperature sufficient to remove unreacted diamylamine and formaldehyde and by-products contained in said mixture but at a temperature below that at which diamylaminomethylcardanol tends to decompose, and recovering diamylaminomethylcardanol in substantially pure form as the residue of said distillation.

14. A method, as defined in claim 13, wherein the diamylaminomethylcardanol-containing mixture is subjected to distillation at below about 150° C.

ANTHONY J. REVUKAS.

REFERENCES CITED

The following references are of record in the file of this patent:

UNITED STATES PATENTS

| Number | Name | Date |
|---|---|---|
| 1,821,095 | Harvey | Sept. 1, 1931 |
| 1,838,070 | Harvey | Dec. 22, 1931 |
| 1,838,077 | Harvey | Dec. 22, 1931 |
| 1,921,292 | Harvey | Aug. 8, 1933 |
| 2,335,693 | Novotny et al. | Nov. 30, 1943 |
| 2,363,134 | McCleary | Nov. 21, 1944 |

FOREIGN PATENTS

| Number | Country | Date |
|---|---|---|
| 635,578 | France | Mar. 19, 1928 |
| 272,509 | Great Britain | Oct. 8, 1928 |

OTHER REFERENCES

Harvey et al.: "Ind. Eng. Chem.," vol. 32, pp. 1306–1310 (1940).